United States Patent [19]

Dumbaugh

[11] Patent Number: 5,046,643
[45] Date of Patent: Sep. 10, 1991

[54] VIBRATORY TYPE STORAGE BIN ARRANGEMENT WITH INTERNAL BAFFLING AND LOW PROFILE BOTTOM

[75] Inventor: George D. Dumbaugh, Louisville, Ky.

[73] Assignee: Kinergy Corporation, Louisville, Ky.

[21] Appl. No.: 534,543

[22] Filed: Jun. 7, 1990

Related U.S. Application Data

[60] Division of Ser. No. 347,240, May 4, 1989, Pat. No. 4,960,229, which is a continuation-in-part of Ser. No. 131,942, Dec. 11, 1987, Pat. No. 4,844,289.

[30] Foreign Application Priority Data

| Oct. 18, 1988 | [CA] | Canada | 580.494 |
| Nov. 21, 1988 | [ZA] | South Africa | 88/8715 |
| Nov. 29, 1988 | [MX] | Mexico | 13.965 |
| Dec. 1, 1988 | [AU] | Australia | 26475/88 |
| Dec. 5, 1988 | [GB] | United Kingdom | 8828371 |
| Dec. 8, 1988 | [DE] | Fed. Rep. of Germany | 3841375 |

[51] Int. Cl.$^5$ ............................................. B67D 5/64
[52] U.S. Cl. .................................. 222/161; 110/101 C; 110/108; 222/547; 222/564
[58] Field of Search ............... 222/161, 196, 547, 564; 414/304; 198/533; 110/101 C, 108

[56] References Cited

U.S. PATENT DOCUMENTS

| 3,178,068 | 4/1965 | Dumbaugh | 222/161 |
| 4,361,254 | 11/1982 | Teraoku et al. | 222/196 |
| 4,679,708 | 7/1987 | Spence | 222/161 |
| 4,844,289 | 7/1989 | Dumbaugh | 222/161 |

FOREIGN PATENT DOCUMENTS 0177831 10/1983 Japan .................................. 414/304

Primary Examiner—Edward G. Favors
Attorney, Agent, or Firm—Lee, Mann, Smith, McWilliams & Sweeney

[57] ABSTRACT

A storage bin arrangement especially suited for receiving, storing and discharging, in accordance with a combination of induced vertical flow and impelled retrieving concepts, bulk solid materials, in one embodiment of which essentially the entire bin itself is arranged for responding to a circular conveying type vibratory helical stroke movement generated by a pair of electric motors secured to the opposite sides of the bin in oppositely oriented positions to dispose their respective driving shafts at opposite, typically 45 degree angulations with respect to the horizontal, and with each such motor shaft driving a pair of eccentrically oriented weights, with the bin having a low profile bottom section equipped with one or more off center located, vertically oriented, vertically rectilinear, discharge chute arrangements and having one or more internally applied baffles, either of inverted cone type or one or more rows or levels of internally applied centerless, radial, sidewall mounted type, in spaced relation, above the bin low profile bottom section, and in a second embodiment, a bin actuator having the features indicated above that is mounted below a large discharge opening in a conventional stationary bin, while responding to the same type of helical vibration to effect both types of material discharge from the bin free of excess beadroom; either embodiment can also eliminate vertical space consuming pant leg type discharge chutes, and provide for optional divided flow of the bulk solid materials therefrom.

3 Claims, 5 Drawing Sheets

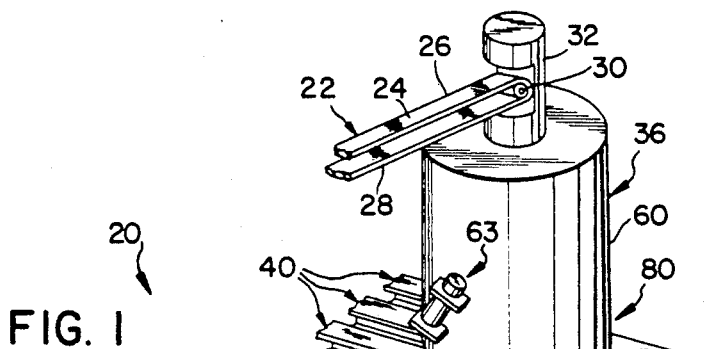
FIG. 1
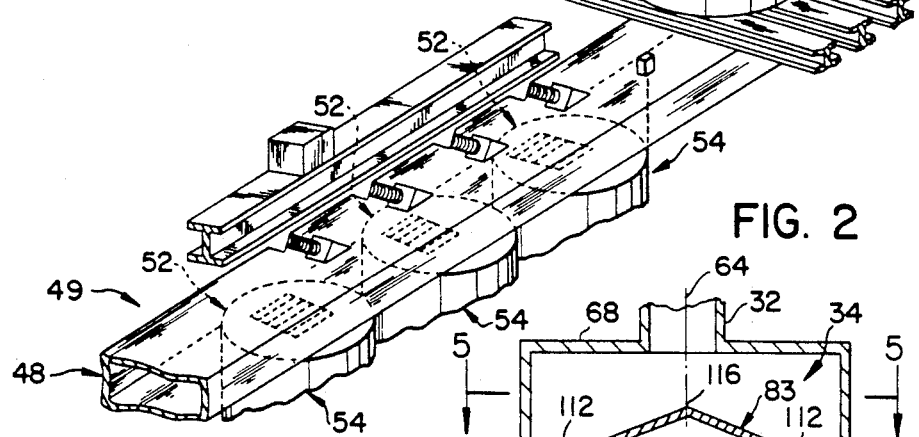
FIG. 2
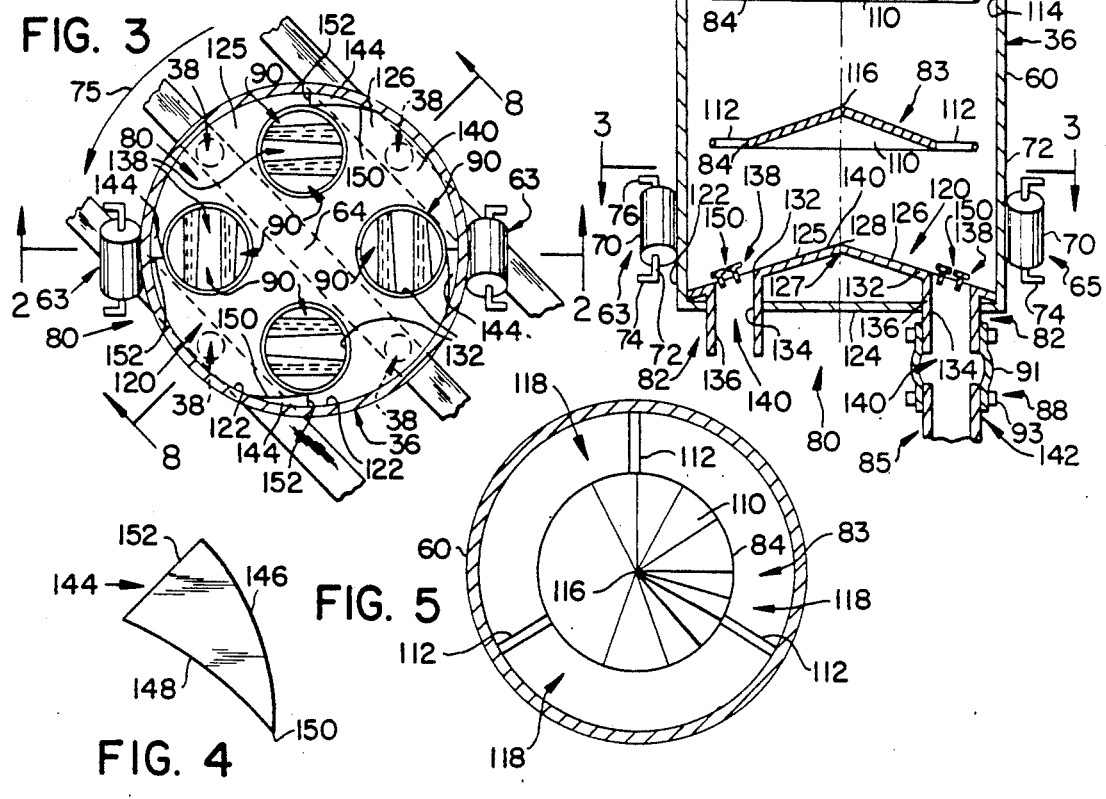
FIG. 3
FIG. 4
FIG. 5

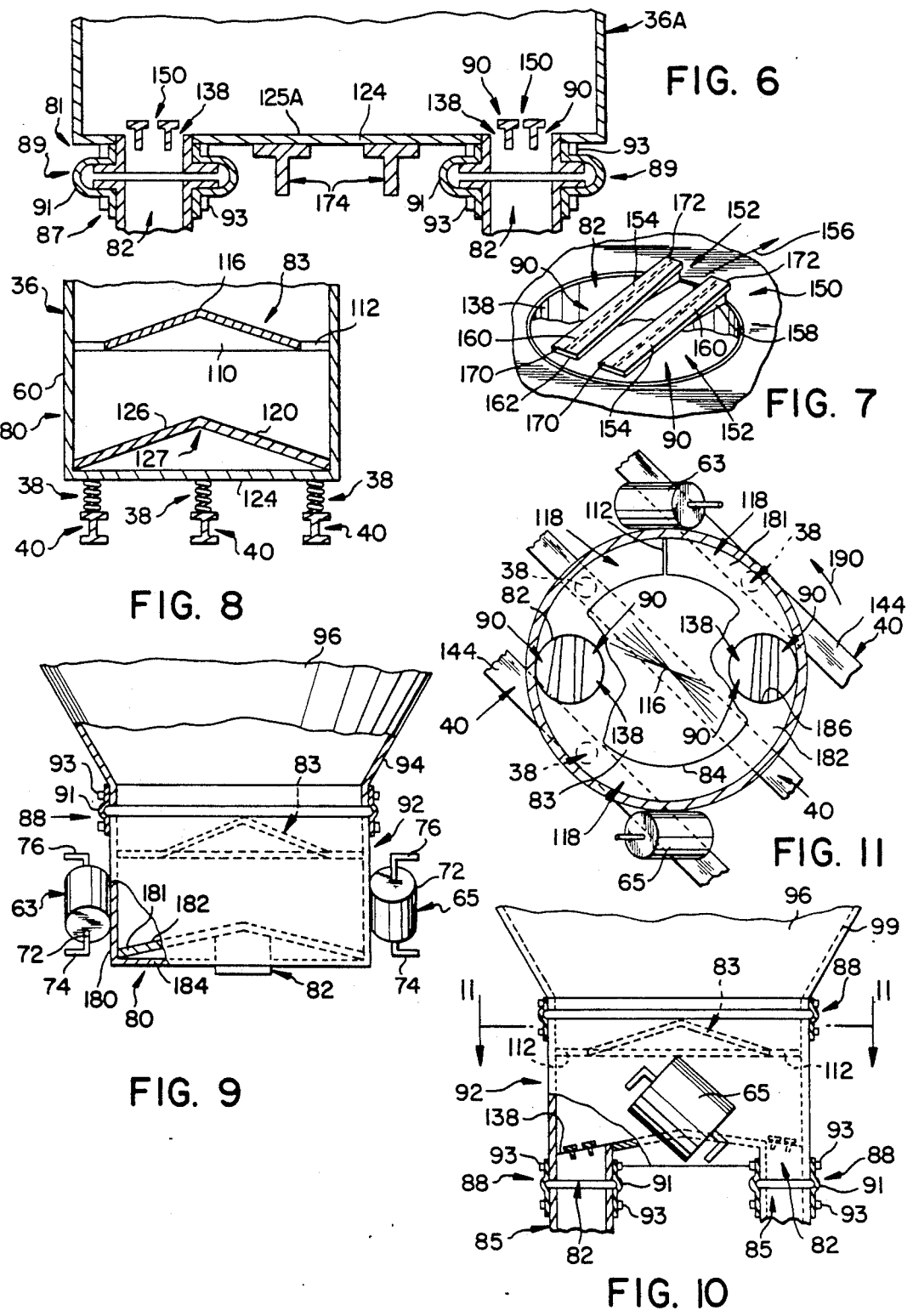

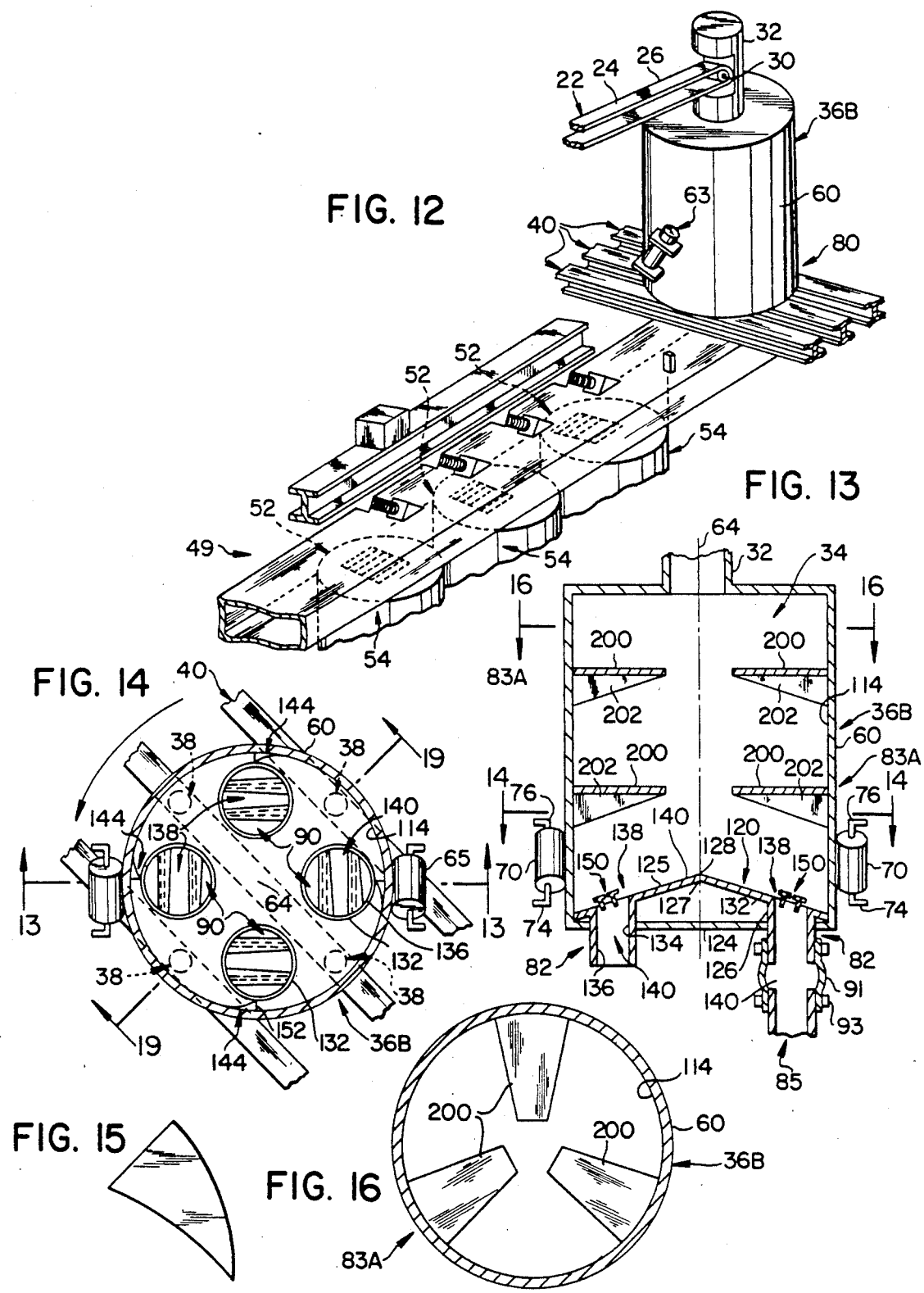

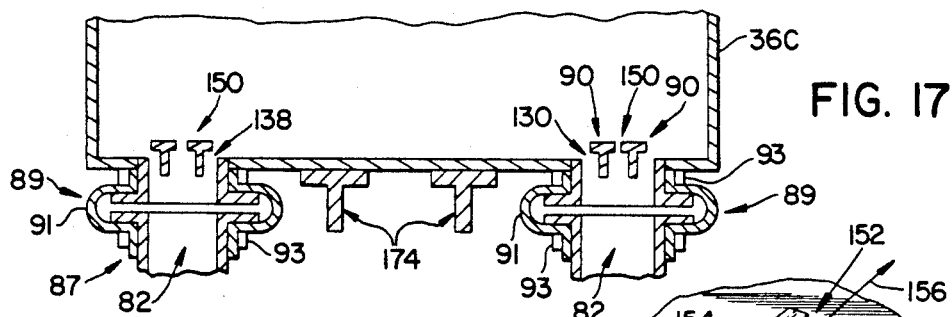
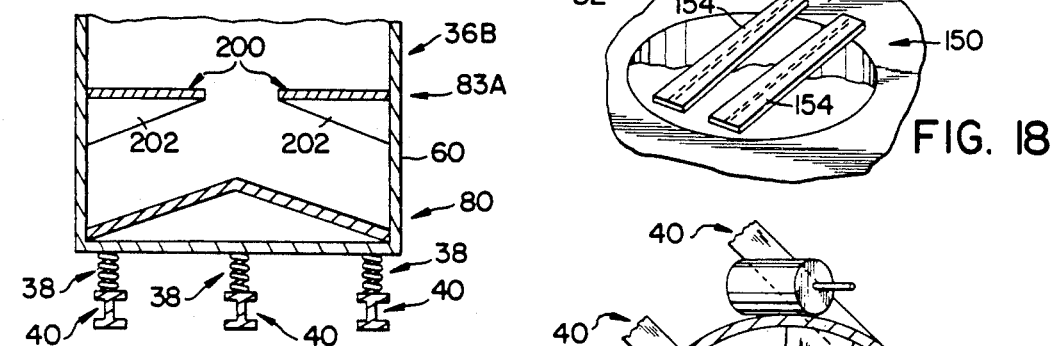
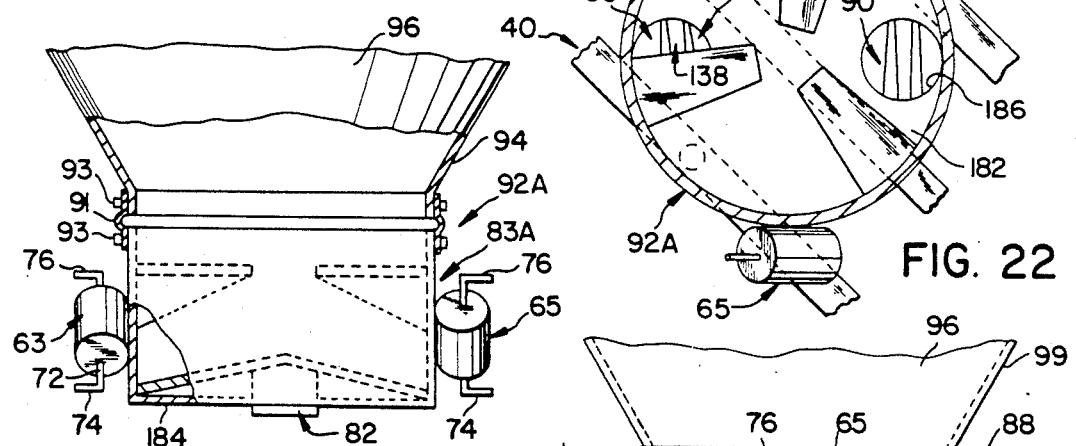
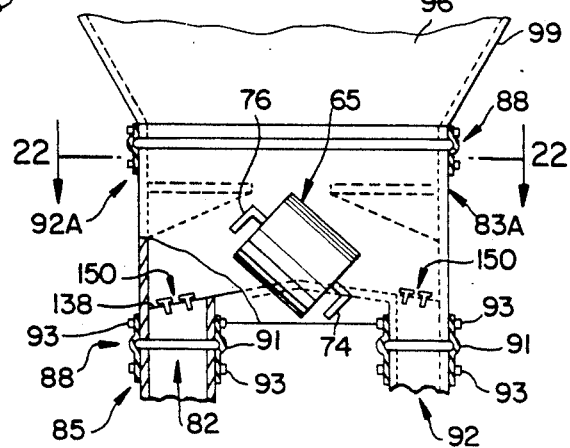

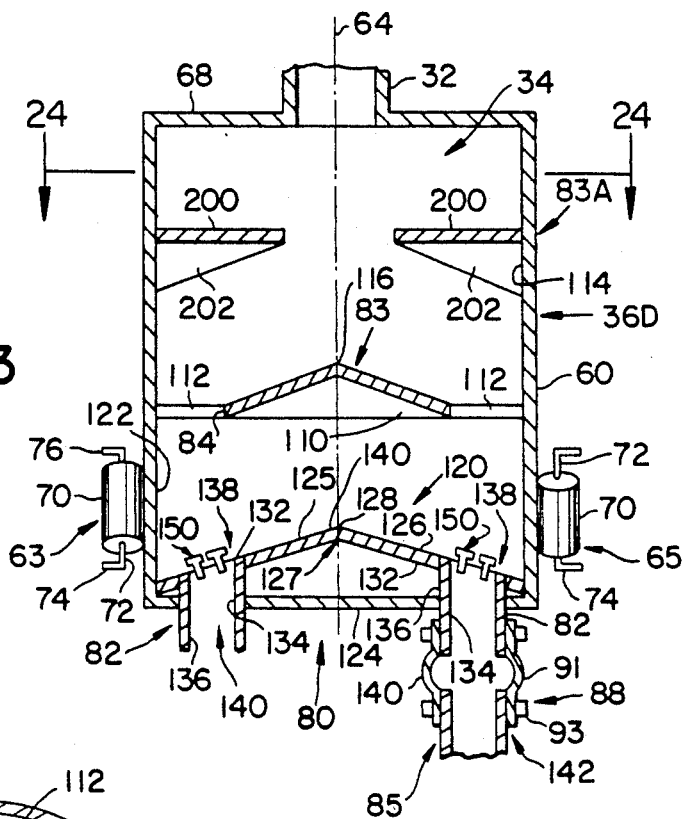
FIG. 23
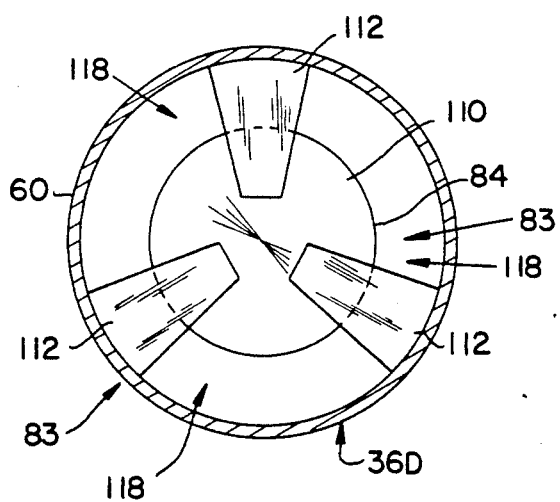
FIG. 24
FIG. 25

VIBRATORY TYPE STORAGE BIN ARRANGEMENT WITH INTERNAL BAFFLING AND LOW PROFILE BOTTOM

This application is a division of my application Ser. No. 347,240filed May 4, 1989 (now U.S. Pat. No. 4,960,229, granted Oct. 2, 1990, which is a continuation-in-part of my application Ser. No. 131,942, filed Dec. 11, 1987 (now U.S. Pat. No. 4,844,289, granted July 4, 1989).

This arrangement relates to storage bin apparatus that combines induced vertical flow and impelled retrieving concepts to provide storage bin arrangements that can be especially adapted for use in refuse derived fuel (RDF) handling systems of the type disclosed in my U.S. Pat. No. 4,774,893, granted Oct. 4, 1988, and more particularly, to storage bin arrangements of the type indicated that act on the stored bulk solid material with a conveying type helical vibratory stroke movement, in which the bin arrangement involved is adapted for installation where a given storage volume is needed but vertical or headroom height is limited, and must be minimized.

My above identified "RDF" Patent is concerned with a system for handling RDF that includes a method and apparatus for receiving, storing and discharging, distributing, and feeding RDF, known to be a "flake" type material, at energy generating plants which use such material for fuel, in which some pieces of the equipment involved in the system utilize solely "induced vertical flow" principles for achieving the discharge of the RDF for these storage means, and in which is involved low power consuming conveying type vibration to keep the RDF moving throughout the system, with a uniform feed flow to the furnace involved, when the system is operating. The storage portion of such system includes a relatively large activated bin for primary surge capacity purposes that initially receives and stores the RDF, to provide a binned quantity of same, from which a continuous flow of the RDF can be discharged into vibrating conveyors that in turn discharge the RDF into smaller capacity metering bins from which the RDF is discharged into vibrating feeders from which the plant furnace or furnaces are supplied with RDF in pulsation free, steady flow, and in a "fluffed" condition, for firing of the power plant involved. In doing so all of the applied equipment involved has the advantage of being essentially "self-cleaning".

As known in the art, the term "impelled retrieving" means with reference to handling bulk solid materials that the bulk solid material or materials is "conveyed" from the storage facility. The term "induced vertical flow" in this art with reference to bulk solid material means that some outside facility reduces interparticle shear strength of the bulk material so that it will respond to gravity activation and flow downwardly.

The present invention is concerned with the providing of storage bin arrangements combining both impelled retrieving and induced vertical flow means, with resulting bin arrangements not only effectively handling RDF materials, but also several other types of fuel that are less difficult to convey, namely wood waste (such as wood bark, wood chips or wood shavings), steam coal, inexpensive coal waste that in the art is known to be of fine particulate makeup of which the particles involved are smaller than 0.125 inch, and any other bulk solid material or materials that will favorably respond to a vibrator conveying action, while at the same time providing for storage units of this type that are specifically applicable where vertical height or headroom space is limited.

My prior U.S. Pat. No. 3,198,068 (the disclosure of which is hereby incorporated herein by this reference) discloses an activated hopper arrangement for receiving and discharging of bulk material that comprises a hopper that is curvilinear about a central vertical axis and is mounted on vibration isolators and has a repeating cycle type helical vibration movement induced in same by a pair of electrical motors secured to opposite sides of the hopper involved, with such motors each having a drive shaft driving a pair of identical eccentric weights, and such motors being oriented to dispose the drive shafts of the respective motors at opposite 45 degree angles, relative to the horizontal. The drive motors involved are driven in the same direction, for instance, clockwise as viewed from above, and when the motors are started they lock into synchronism with one another, with the eccentric weights of the respective motors phased in such a manner that all of the eccentric weights involved are directed inward towards the hopper vertical axis at the same instant, and are directed outward away from the hopper vertical axis at another instant whereby during each complete rotation of the respective motor shafts, there is first produced a couple tending to horizontally rotate the hopper in one direction and then there is produced a second couple tending to rotate the hopper in the opposite direction, about the indicated hopper vertical axis. Because of the inclination of the motor shafts, each complete rotation of the motor shafts not only causes one complete oscillation of the hopper about its vertical axis, but also causes one complete vertical reciprocation of the hopper. The combined twist and vertical reciprocation of the hopper is a helical type vibrator movement resultant.

A principal object of the present invention is to employ, in connection with storage bins of the type disclosed in my said U.S. Pat. No. 4,774,893, the helical vibratory bin movement of the type disclosed in my said U.S. Pat. No. 3,178,068, in combination, in bin arrangements for bulk solid material or materials made available by the present invention, with a low profile bottom section to achieve maximized storage volume in the least amount of height and ready discharge of the bulk solid material or materials involved, including RDF and other fuels of the type indicated (which may be referred to as multi-fuels or other materials insofar as this equipment is concerned), thus providing storage bin arrangements that combine both impelled retrieving and induced vertical flow concepts.

Another principal object of the invention is to provide bin arrangements having a low profile bottom section that are arranged for imparting helical vibrating movement of the type disclosed in my said U.S. Pat. No. 3,178,060, that have one or more internal baffle arrangements above the bin bottom section for providing induced vertical type flow of the bulk solid material or materials stored in the bin down through the bin when the bin is vibrated in the manner disclosed in said U.S. Pat. No. 3,178,068, and that also have as part of such bottom section a bulk solid material conveying surface of the impelled retrieving type and one or more peripheral or outboard edge vertically oriented, vertically rectilinear, discharge chutes (that may be of either circular or polygonal transverse cross-sectional configuration) through which the bulk material can pass in exiting from the bin arrangement involved, or optionally will pass over when the discharge chute in question is filled due to backup below, again when such bin arrangement experiences the aforementioned helical vibrating movement.

Still another principal object of the invention is to provide a low profile bottom section bin actuator for stationarily mounted bins or hoppers adapted to receive and store for later discharge bulk materials, which bin activator has the indicated helical vibrating movement, one or more of the internal baffle arrangements above the actuation bottom section, the low profile bottom section with its conveying surface, and the peripheral or outboard edge located, vertically oriented, vertically rectilinear, discharge arrangements, referred to above, which bin actuator may be mounted below and in centered alignment with the usual discharge frusto-conical outlet of such stationarily mounted storage bins, with the option of dividing the discharge from the bin arrangement involved, where desired, and eliminating the need for "pant leg" type chutes to achieve space saving fits for applications where the vertical height is limited.

Still another object of the invention is to provide a low profile activated bin arrangement adapted to handle not only RDF, but also wood waste type fuel materials and coal in fine particulate inexpensive form, as well as other bulk solid materials that are responsive to conveying type vibrational action, to provide activated bin arrangements of the types indicated that are inexpensive to manufacture and operate, that are inherently self cleaning, and operate quietly in an essentially wear free manner, and that by using conventional flexible socket connections, can be dust free in operation.

In accordance with the present invention, in one example of the invention, an activated bin arrangement is provided in the form of a vessel defining a cylindrical side wall that is symmetrical about a vertical axis at the center of the vessel, and has means for imparting an oscillating helical vibrating movement about such vertical axis for effecting discharge of the bulk solid material or materials received in the bin downwardly and outwardly of the bin, wherein the vessel includes, affixed internally of its side wall, one or more levels of vertically spaced baffles, and includes, below such baffles, a low profile bottom section with a material conveying surface, and having at least one discharge port arrangement defining a vertically rectilinear discharge chute having a vertical central axis, and located adjacent the bin side wall periphery for maximizing the bulk solid material holding capacity of the vessel while providing for a uniform material flow discharge rate from the vessel that optionally may include one or several of the indicated discharge chutes for supplying the bulk solid material or materials to different and separate distribution conveyors that may be of the vibratory type disclosed in my said U.S. Pat. No. 4,774,893. The material conveying surface of the low profile bottom section of the bin preferably is in the form of an inverted cone, the apex of which is upwardly projecting, and the upper surface of said cone forms said material conveying surface; when the vessel is subjected to helical vibrating movement, the cone material conveying surface acts to convey the bulk material involved to and into said chutes, which are preferably located at the periphery of the cone. The bin arrangement involved also includes, above the bin bottom section, one or more baffles that, when the vessel is subjected to helical vibrating movement, act to effect induced vertical flow concepts in the bulk solid material or materials stored in the bin, and includes, at the level of the bin bottom section, a flow deflector adjacent each discharge chute for guiding the bulk material into same for achieving full self cleaning action, when the vessel is subjected to helical vibrating movement and the bin has been largely cleared of the bulk material.

The vessel internal baffles may be of the inverted cone type disclosed in my said U.S. Pat. No. 4,774,893, or may be of the radial centerless type (as herein specifically disclosed), or may be of both types, and/or the material conveying surface of the low profile bottom section may be in the form of a horizontal bottom plate suitably reinforced against vertical vibration movement, as well as the indicated discharge chute or chutes disposed adjacent to its periphery.

In another embodiment, a bin activator for stationarily mounted bins is disclosed as having the improvements referred to, which activator is mounted on vibration isolators below and in centered alignment with the usual frusto-conical discharge spout of conventional stationarily mounted bins, with this version of the invention avoiding the need to have vertical or headroom space consuming, "pant leg" type of chute or chutes, to direct the discharge from the bin involved.

Further in accordance with the invention, the entrance to the low profile bottom supporting discharge chutes may be equipped with a ramping arrangement for conveying RDF type fuels or similar materials over a filled outlet being handled by the activated bin arrangement involved.

Other objects, uses, and advantages will be obvious or become apparent from a consideration of the following detailed description and the application drawings in which like reference numerals indicate like parts throughout the several views.

In the drawings:

FIG. 1 is a fragmental perspective view of the general type represented by FIG. 23 of my above identified U.S Pat. No. 4,774,893, illustrating a simplified embodiment of the invention of my said U.S. Pat. No. 4,774,893, including the storage bin thereof, which bin is arranged in accordance with one of the embodiments of the present invention;

FIG. 2 is a vertical sectional view of the activated bin arrangement shown in FIG. 1, taken substantially along line 2—2 of FIG. 3.

FIG. 3 is a horizontal sectional view of the storage bin arrangement of FIGS. 1 and 2, taken substantially along line 3—3 of FIG. 2, and showing also the stationarily mounted beams for supporting the vibrational isolators for the activated bin involved, which isolators are diagrammatically illustrated in FIG. 8;

FIG. 4 is a perspective view of one of the deflector plates that are mounted on the bin bottom, and within the activated bin, for guiding conveyed bulk material moving over the bin bottom, to the respective outlet chutes thereof, upon helical vibrating movement being imparted to the bin;

FIG. 5 is horizontal sectional view through the bin of FIGS. 1-3, taken substantially along line 5—5 of FIG. 2, better illustrating in top plan the bin conical baffles and their manner of mounting within the bin;

FIG. 6 is a view similar to that of FIG. 2, but on an enlarged scale, and illustrating a modified storage actuated bin arranged in accordance with this invention having low profile, bulk material conveying surface providing bottom section in the form of a horizontal reinforced plate;

FIG. 7 is an enlarged perspective view of the ramping arrangements that may be employed in connection with the bin discharge chutes of the embodiments of FIGS. 1-6, where RDF is to be handled, for conveying the RDF (or similar material) over the discharge opening involved, in the event that the discharge chute of such opening is filled due to back up from below;

FIG. 8 is a fragmental vertical sectional view of the storage bin, similar to that of FIG. 2, taken substantially along line 8—8 of FIG. 3;

FIG. 9 illustrates another alternate embodiment of the invention in which a bin activator that is equipped in the same manner as the bin arrangements of FIGS. 1-8 is connected to and below and in centered relation with, a conventional stationarily mounted bin, for providing the improvements of this invention as well as eliminating the need for headroom space consuming "pant leg" type of chute to divide the discharge flow from the bin involved into separate streams;

FIG. 10 is a view of the left hand side of the bin activator and associated parts of FIG. 9;

FIG. 11 is a vertical sectional view taken substantially along line 11—11 of FIG. 10;

FIG. 12 is a view similar to that of FIG. 1, illustrating a simplified embodiment of the invention of my said application, including the storage bin thereof, which bin is arranged in accordance with another of the embodiments of the present invention;

FIG. 13 is a vertical sectional view of the activated bin arrangement shown in FIG. 12, taken substantially along line 13—13 of FIG. 14;

FIG. 14 is a horizontal sectional view of the storage bin arrangement of FIGS. 12 and 13, taken substantially along line 14—14 of FIG. 13, and showing also the stationarily mounted beams for supporting the vibrational isolators for the activated bin involved, which isolators are diagrammatically illustrated in FIGS. 8 and 19;

FIG. 15 is similar to FIG. 4;

FIG. 16 is a horizontal sectional view through the bin of FIGS. 12-14, taken substantially along line 16—16 of FIG. 13, better illustrating in top plan the bin conical baffles and their manner of mounting within the bin;

FIG. 17 is a view similar to that of FIG. 6;

FIG. 18 is similar to FIG. 7;

FIG. 19 is similar to FIG. 9 and is taken substantially along line 19—19 of FIG. 14;

FIG. 20 illustrates another alternate embodiment of the invention in which a bin activator that is equipped in the same manner as the bin arrangements of FIGS. 12-14 is connected to and below and in centered relation with, a conventional stationarily mounted bin, for providing the improvements of this invention as well as eliminating the need for headroom space consuming "pant leg" type of chute to divide the discharge flow from the bin involved into separate streams, similar to the embodiment of FIGS. 9-11;

FIG. 21 is a view of the left hand side of the bin activator and associated parts of FIG. 20;

FIG. 22 is a vertical sectional view taken substantially along line 22—22 of FIG. 21;

FIG. 23 is similar to FIGS. 2 and 13, but illustrates a bin arrangement embodiment in accordance with the invention that is equipped with both the disclosed internal baffle types above the bin low profile bottom;

FIG. 24 is similar to FIGS. 5 and 16, but is taken on line 24—24 of FIG. 23; and, FIG. 25 is similar to FIG. 24 but illustrates a further modification of the invention.

However, it is to be distinctly understood that the drawing illustrations referred to are provided primarily to comply with the disclosure requirements of the Patent Laws, and that the invention is susceptible of modification and variations that will be obvious to those skilled in the art, and that are intended to be covered by the appended claims.

GENERAL DESCRIPTION

Referring first to the diagrammatically illustrated showing of FIG. 1, which fragmentally corresponds to the showing of FIG. 23 of my said RDF handling U.S. Pat. No. 4,774,893, after the RDF to be supplied to system 20 has been shredded to a nominal working size (such as 6 inches), and passed under a suitable electromagnet arrangement for removal of the ferrous metals therefrom, the RDF is suitably applied to a suitable conventional belt conveyor 22 or the like, in which the belt conveyor defines a suitable endless belt 24 that is suitably trained to define upper run 26 and lower or return run 28, with the belt 22 being trained over suitably journaled end pulley 30 that effects the deposit or dropping of the RDF into a suitable intake conduiting 32 that communicates with the interior 34 of a relatively large activated storage bin 36 that provides a primary surge capacity storage of the RDF as supplied to the system 20, as disclosed in my said RDF handling patent application.

In the bin arrangement of FIGS. 1-8, the activated bin 36 is mounted on suitable vibration isolators 38 (see FIG. 8) that in the form illustrated are supported by stationarily mounted beams 40, with the conduiting 32 being integrally connected to the activated bin 36 in any suitable manner.

As disclosed in my said U.S. Pat. No. 4,774,893, the RDF accumulating in the storage activated bin 36 is to be discharged to the trough 48 of an up side down vibrating conveyor 49 that moves the RDF involved to the locale of the furnace to be serviced by the system, at which locale are appropriately mounted one or more vibrating feeder trains 52 arranged as disclosed in my said patent application, with each train 52 involving at least one metering activated bin 54 (in a simplified therein disclosed embodiment) that in the form diagrammatically shown in FIG. 1 are supplied by the up side down vibrating conveyor 49 from its trough 48; the material bins 54 in turn supply the RDF as needed to separate and parallel vibrating feeders below same (that are not illustrated in FIG. 1 of this application) that convey the separate RDF flows involved to the respective furnace feed chutes, all as disclosed in my said U.S. Pat. No. 4,774,893 along with other embodiments.

The primary storage activated bins 36 are designed to have a relatively large capacity, such as that in the range of from about 1,000 cubic feet to about 4,000 cubic feet; they each define an upright wall 60 that may, for instance, be twelve feet in diameter and twenty feet high. The bins 36 of this application each rest on the indicated suitably supported vibration isolators 38, which may be of any suitable type known to the art, such as those illustrated in my said prior U.S. Pat. No. 3,173,068.

Each bin 36 can have its inlet 32 integral with the top cover 68 that is shown to be integral with the bin side wall 60, as illustrated in FIG. 2. However, bulk material bins in this art frequently have the bin cover 68 mounted stationary, and are flexibly connected to the bin side wall 60, and the present invention is readily adapted for application to such arrangements, which can be suitably removably connected to the bin side wall 60, as is well known in the art.

As disclosed in my said U.S. Pat. No. 3,178,068, the bin 36 is of the two motor vibrational cycle type, and comprises a pair of driving motor assemblies 63 and 65, which include the usual equipment excitors involved with 360 degrees of rotation. Assemblies 63 and 65 are mounted in diametrically opposite sides of the activated bin 36, and at identical levels of operation on the exterior of the bin side wall 60, that, as indicated in FIGS. 3 and 5, is preferably circular in configuration and symmetrical about the vertical central axis 64 of the bin 36.

As is also disclosed in my said U.S. Pat. No. 3,178,068, the driving motor assemblies 63 and 65 each comprise a motor 70 have a drive shaft 72 actuating a pair of eccentrically mounted identical weights 74 and 76. As indicated, the motors 70 are mounted on opposite sides of the bin side wall 60 (180 degrees apart) and are disposed so that their respective drive shafts 72 are at opposite approximate 45 degree angle relationships with respect to the horizontal. In other words, the motor shafts 72 are oppositely inclined an equal amount (see FIG. 3) and at said angles to a vertical plane passing through the bin 36 and its vertical axis 64 and through the mid points of the two motor shafts 72. As previously indicated, the driving motor assemblies 63 and 65 provide a helical vibratory movement of the bin 36. As soon as the motors 70 are started (they are suitably electrically connected for simultaneous starting) they lock into synchronism with one another, with the weights 74 and 76 of the respective motors 70 being phased in such a manner that all the weights 74 and 76 are then directed inward toward the bin vertical axis 64 at one instant, and are directed outward away from such vertical axis 64 at another instant. With the driving motor assembly eccentrics phased in this manner, they produce, on rotation of the respective shafts 72 involved, a couple tending to horizontally rotate the bin 36 in one direction about its axis 64, which is followed by a couple tending to horizontally rotate the bin 36 in the opposite direction, that is in turn followed by successive alternate couples. Thus, with each complete rotation of the respective motor shafts 72, the bin 36 executes one complete oscillation about its vertical axis. As the respective motor shafts 72 are inclined as indicated each complete rotation of the respective motor shafts 72 not only causes one complete oscillation of the bin about its vertical axis 64, but also causes one complete vertical reciprocation of the bin 36. The resultant of the combined oscillation and vertical reciprocation effected on bin 36 is the helical vibratory movement of the bin 36 that conveys the bulk material within the bin 36 about axis 64 in the direction of circular arrow 75 (of FIG. 3).

Pursuant to the invention, the storage bin 36 of FIGS. 1-5 and 8 has a low profile bottom section 80 equipped with an impelled retrieving type material conveying upper surfacing 125 and induced vertical flow type conveying discharge chutes 82. The bin low profile bottom section in accordance with the invention may also take the form of the low profile bottom section 81 of FIG. 6, that is equipped with one or more discharge chutes 87 that are arranged similarly to the chutes 82.

The storage bins 36, further in accordance with the invention, are, above their low profile bottom sections 80 or 81 internally equipped at their baffle levels 79 with one or more vertically spaced baffles 83 of the inverted cone type that have their peripheries 84 well spaced within the interior of the bin side wall 60, for facilitating down feed of the bulk material supplied to the bin 36 on operation of the driving motor assemblies 63 and 65.

As indicated, the bin low profile bottom bulk material conveying sections 80 and 81 are equipped with one or more vertically oriented vertically rectilinearly discharge chutes 82 and 87 that may be round (as shown) or polygonal in transverse cross section configuration; the chutes 82 and 87, respectively, are flexibly connected to bulk material receiving and passing intake tubings of the general type indicated by reference numeral 85 in FIG. 2, by employing the conventional flexible connections where indicated at 88 in FIG. 2, and 89 in FIG. 6.

The intake tubings 85 may be one or more in number and discharge into, for instance, the trough 48 of conveyor 49; alternately the tubings 85 may respectively discharge into the troughs 48 of different vibrating conveyors that convey, for instance, RDF, to different furnaces at separate locations within a power plant. Of course, for every tubing 85 provided there will be a chute 82 or 87 connected thereto.

The flexible connections 88 and 89 are both well known to this art, they involving the usual flexible tubes 91 that are held in place by suitable draw bands 93, so that the bin 36 and the conveyors 49 can vibrate as needed to provide the bulk material flow contemplated by the invention.

An important feature of the invention is that where the chute arrangements 82 and 87 are employed, their inlet ends are each, provided with ramps 90 of the type disclosed in my said U.S. Pat. No. 4,774,893 to, where RDF constitutes the bulk material involved, convey the RDF entirely across any chute arrangement 82 or 87 that is filled due to backup of the RDF material into the chute arrangement involved, from below, because the particular vibrating conveyor supplied by the storage bin is more than adequately filled with the RDF material involved or is not in use. Ramps 90 also have a beneficial fluffing effect on the RDF, as disclosed in my said application.

In the arrangement of FIGS. 9-11, a bin actuator device 92 is disclosed, which is to be added to the lower end 94 of a large discharge outlet 96 of a stationary storage bin of the usual configuration (not fully shown), with the actuator 92 being flexibly secured to the lower end 94 of the stationary storage bins transition cone 96, as by employing a flexible connection 88 or 89. The actuator 92 is adapted to be a bulk material flow actuator for conventional stationarily mounted storage bins, and is arranged to have the invention aspects associated therewith that are disclosed in connection with the actuated bin 36 of FIGS. 1-5 and 8, though the modifications that are illustrated in FIG. 6 can be employed instead, for instance, as the bin actuator low profile bottom conveying surface section 81.

In the general arrangement of FIGS. 12-19, the activated bin 36B is generally similar to the arrangement of FIGS. 1-8 (as indicated by corresponding reference numerals), but instead of being internally equipped with one or more baffles 83 (at the indicated level or levels), the bin 36B is internally equipped above its low profile bottom section 80 with one or more levels of radially disposed centerless baffles 83A, while in the bin actuator arrangement 92A of FIGS. 20-22, the same baffle arrangement is employed.

In the general bin arrangement 36D of FIGS. 23 and 24, both types of baffles 83 and 83A are employed, and in the bin arrangement 36E of FIG. 25 the baffles 83A at adjacent levels of same are displaced about the bin vertical center 64 so as to be disposed out of vertical alignment with the baffles above and below same.

SPECIFIC DESCRIPTION

Referring first to the activated storage bin 36 of FIGS. 1-5 and 8, the bin driving motor assemblies 63 and 65 of my said patent are there dealt with in detail, with their mounting arrangements involved being the same as that disclosed in my said patent, so as to provide the bin 36 with the helical vibratory movement about the bin vertically disposed central axis 64 that is disclosed in said patent. The vibratory action of bin 36 that results, assuming the bin 36 contains at least a significant quantity of, for instance, RDF or one of the other bulk solid materials hereinbefore referred to (as compared to the storage capacity of bin 36), forming a body of such material or materials that may be said to be columnar in nature, and creates a "headload" or downward acting pressure within the bulk solid material involved that causes such material to divide at baffles 83 and flow downward within bin 36, between the respective baffles 83 and the bin side wall 60, and convey over and around the bottom low profile surface 125 and eventually pass into and down through the chutes 82, under gravity. The isolators 38 as supported by the respective fixed I beams 40 are conventionally arranged to permit the vibratory motion indicated, with the isolators being arranged about the periphery of the bin 36 in the manner indicated in FIG. 3.

It will be apparent to those skilled in the art, in this connection, that the entire bin 36 may be arranged to have the vibratory motion indicated, including the inlet tubing 32, or alternately, the inlet tubing 32 in the top 68 of the bin 36 may be stationarily mounted, and a suitable flexible connection of the general type indicated by, for instance, reference numeral 88 made between the bin top 68 and the bin side wall 36 where the bin top 68 is separated from the bin side wall 36 in that variation.

In any event, the bulk solid material or materials within bin 36, pass through bin 36, and by its baffles 83, under the induced vertical flow acting on same at the respective levels 79 of baffles 83, and at the bin low profile bottom surface 125, impelled retrieving principles effect discharge of the bulk solid material or materials into the respective chutes 82, where induced vertical flow principles again in accordance with the invention.

The baffles 83 of the bin 36 at such baffle levels 79 each comprise a conically shaped disc member 110 that is fixed by welding or the like to a number of radially oriented support rods 112 for the respective baffles 83 (three for each baffle 83 in the illustrated embodiments), which are in turn suitably affixed to the inside surfacing 114 of the bin cylindrical side walls 60, as by employing welding techniques or the like. Each baffle 83 includes an apex 116 that points upwardly and is approximately aligned with the central vertical axis 64 of the bin 36; thus, each baffle 83 is of the inverted cone type. The respective baffles 83 thus define between the support rods 112 and along the margins 84 of the respective discs 83, feed through openings 118 that are aligned vertically of the bin 36. Where the bulk material within bin 36 covers one or more of the baffles 83, the vibratory movement of the bin that it is subjected to by driving motor assemblies 63 and 65 has a conveying movement of the impelled retrieving type on the bulk solid material overlying same, which results in the discharge downwardly of the bulk material through successive levels of openings 118, in a self cleaning, induced vertical flow conveying type manner, as the bulk material below the baffles 83 is fed from the bin 36 through chutes 82.

The number of baffles 83 employed on any particular bin 36 to form the respective baffle levels 79 will depend on the size of the bin 36 and the type or types of bulk solid material involved. Thus for relatively small bins 36 only one baffle 83 may be required, while for larger bins 36, two or more baffles 83 may be required, so that the "levels" represented by baffles 83 may be one or a multiple of such levels 79; baffles 83 are preferably employed where at the respective baffle levels 79 the bulk solid material is of the general or floodable type, such as coal, limestone, fly ash and readily handled flake materials such as wood chips and some forms of RDF, such as some forms of shredded waste or garbage (for instance, paper, plastic, vegetables and meat) and pieces of wood; experience has shown, in this connection, that baffles 83 are effective for handling RDF when the particle size is less than about two inches in any given dimension. For larger size RDF, it is recommended that the hereinafter disclosed "centerless" internal baffles be employed at the corresponding baffle levels 79 (see FIGS. 12-22).

The low profile section 80 of the bin 36 comprises a conical plate 120 that is similar to the baffles 83 for self cleaning and structural rigidity reasons, but has its periphery 122 proportioned for substantially complementary fit within the inside surfacing 114 of the bin 36 to rest against the bin bottom wall 124 that is to be essentially horizontally disposed in the operating relation of the bin 36. The plate 120 comprises the conically configured disc member 126 defining the conical material conveying (of the impelled retrieving type) surface 125 that includes a central apex 128 that also is to be substantially aligned with the central vertical axis 64 of the bin 36; its periphery 122 is suitably seal connected to bin 36, its wall 60 and bottom wall 24. Disc member 126 is struck to have an angular relationship with bottom wall 124 (and thus to the horizontal) that preferably lies in the range of from about ten degrees to about twenty degrees, so as to define a feed plate 120 that is relatively shallow, it being in inverted relation for rigidity and self cleaning purposes.

In the form of the bin 36 that is shown in FIGS. 1-5 and 8, the inverted conical disc member 126, which thus forms the feed plate 120, of the impelled retrieving conveying type and the bin bottom wall 124, are suitably apertured, as at 132 and 134, respectively, in vertically aligned relation to receive the respective vertically disposed or oriented discharge chutes 82 that are appropriately secured in place, in each case, to the feed plate 126 and the bin bottom wall 124 in any suitable manner, as by employing welding techniques. The discharge chutes 82 are in the form of tubes 136 that thus define bulk material upper intake ports 138 (which are thus outlet ports for the bin 36) and bulk material lower discharge ports 140 that are respectively connected, by employing a suitable flexible connection 88 or 89 to outlet tubing or chutes 85 shown in the form of tubes 142 that are suitably mounted, for instance, on the trough of the vibratory conveyor 49. For this purpose each of the tubes 136 may be thus suitably connected to a separate intake tubing 85, such as tubing 142 of the vibratory conveyors that convey the bulk material in other directions, this arrangement being particularly useful where the invention is applied to RDF handling systems, as has already been indicated.

Further in accordance with the invention, each bulk material chute opening or aperture 138 of the feed plate 120 has affixed adjacent same, and adjacent the feed surfacing 125 of member 126, and adjacent each said opening 138, an essentially triangular deflector blade or ramp 144 shown in perspective in FIG. 4, to guide the bulk material tailings or straggler or the bulk material passing through bin 36, into the respective openings 138, to complete the removal of the bulk material from the bin 36, and achieve full self cleaning action of bin 36, when the bin 36 is subjected to the helical vibratory motion that has been indicated on energization of the motor assemblies 63 and 65. As shown in FIGS. 3 and 4, the deflectors 144 have their longitudinally extending edgings 146 and 148 merge at pointed end 150 (where the bulk material guiding action starts), and end at transverse edge 152, with the edgings 148 being suitably bonded to bin 126 along the periphery 122 of feed plate 120, as by employing welding techniques, so that the discharge guiding portions of the deflectors 144, as represented by the edgings 146 and 152, are arced in bulk material feeding relation to the respective discharge openings 138, as indicated in FIG. 5.

It should be understood that the activated bins 36 can be arranged to have a single discharge chute 82 applied to same, as for supplying RDF to the trough of the conveyor 49, or the bins 36 can have up to four outlets defined by the respective chutes 82 (for assistance in employing RDF techniques of the type disclosed in my said patent application). The bins 36 employed may be conveniently provided with two such chutes 82, spaced one hundred eighty degrees apart, in order to supply two different distribution vibratory conveyors of the type represented by conveyor 49.

In any event, the discharge chutes 82, and in particular, their openings 138, are preferably each provided with ramps 90 of the type disclosed in my said RDF patent application, where RDF is to be handled, so that should one of the chutes 82 be filled due to the accumulation and back up, of the RDF material of the vibratory conveyor trough serviced by a particular discharge chute 82, the RDF can convey over the opening 138 of the filled chute 82 to the next discharge chute 82, and specifically its aperture 138, of the activator bin 36 involved.

The individual ramps 90 each comprise a ramp assembly 150 each in turn comprising an inclined plate 154 that is inclined in the direction of bulk material flow (indicated by arrow 156 of FIG. 7) upwardly approximately five degrees, with each of the plates 154 preferably being reinforced longitudinally thereof by respective cross plates 156 that are in effect vertically disposed and extend longitudinally of the respective plates 154. As indicated by the diagrammatic FIG. 7, which illustrates the ramping assemblies 150 involved for both of the activated bin low profile bottom section arrangements 80 and 81, the ramp plates 154 have their upper surfacings 160 substantially level with the surfacing of the bin cone or flat bottom at the entrance end 162 of each intake aperture 138, with the upward inclination of the respective plates 154 at the downstream flow ends 172 of the respective ramp plates 154 (as dictated by the direction of bulk material conveying movement that is indicated by the arrow 156), disposing the ramp plate end 172 above the level of the cone or flat bottom surfacing about the respective apertures 138. As disclosed in my said patent application, it is also important that ramp plates 154 be suitably affixed in place across the respective apertures 138, and that the upstream ends 170 of same be wider than the downstream ends 172 of same, so that the ramp members 154 of each aperture 138 diverge from each other in the direction of conveying of the bulk material within the activated bin 36, upon energization of the respective motor assemblies 63 and 65. The ramp plates 154 thus taper from a wider dimension at their leading ends 170 to a narrower dimension at their trailing ends 172, whereby they diverge in the conveying direction of the bulk material. The apertures 138 of a particular activated bin 36 may be provided with one or more of the indicated ramps 90, depending on the diameters of the respective openings 138 and the nature of the bulk material to be handled by the activated bin 36. In the drawing Figure a pair 152 of such ramps 90 is shown for illustrative purposes.

In the activated bin 36A of FIG. 6, the feed plate 120 is omitted, with the vertical chutes 87 being applied directly to a truly flat bottom wall 124 to form the low profile activated bin bottom section 81 and the impelled retrieving type conveying surface 125A of same. The horizontally disposed bottom wall 124 is suitably reinforced, as where indicated by reference numerals 174, to prevent undue vibration of the wall 24. The showing of FIG. 6 also illustrates an alternate form of flexible connections 89 of a conventional type. It is pointed out that the low profile bottom section arrangement of the embodiment of FIGS. 1-5 and 8 is preferred because of the structural stiffness provided by the conical shaping of feed plate 120 (that requires so significant additional reinforcement) and its self cleaning benefits.

Referring now to the embodiment of FIGS. 9-11, the vibratory bin activator 92 comprises cylindrical side wall 180 that is secured to the lower end 94 of the familiar frusto-conical shaped discharge outlet 96 of a stationary bin that is not fully illustrated), as by employing a suitable flexible connection 88 (see FIG. 2). The bin actuator 92 that is illustrated includes low profile bottom section 80 and its impelled retrieving type conveying surface 181, and thus comprises inverted cone member 182 that is comparable with the feed plate 120 of bin 36, and the horizontal actuator bottom wall 184 that is comparable to the bottom wall 124 of bin 36.

The actuator 92 is also equipped with a pair of oppositely disposed discharge chutes 82 in the same manner as shown in connection with the bin 36 (see FIGS. 10 and 11), with the outlet openings 138 thereof each being provided thereacross with the ramp arrangements 90 that are more specifically shown in FIG. 7, and each opening 138 having the afore disclosed deflector blade 144 for self cleaning purposes.

The bin actuator 92 is mounted on vibration isolators 38 in the same manner as already illustrated and described with respect to the bin 36 (see FIG. 11).

The bin actuator 92 is also equipped with an opposed pair of motor assemblies 63 and 65 that are arranged and secured thereto in the same manner as the bin 36, so that on actuation of the motor assemblies 63 and 65, the bin actuator 92 effects a bulk material conveying action over the bin actuator conveying surface 181, in the direction of the arrow 190 within the actuator 92, for effecting discharge of the bulk material through the respective actuator discharge openings 138 to and through the respective vertical discharge chutes 82 and into suitable receiving tubes 85 that lead to the troughs 48 of different vibrating conveyors 49 for conveyance to different parts of a power plant, for instance, for application to different furnaces of RDF used about the plant.

The actuators 92 may also have one or more levels 79 of baffles 83 applied thereto, as indicated in dashed lines in FIGS. 9 and 10, with the number employed being dependent on the length or height of the actuator 92 longitudinally of its side wall 10 and the nature of the bulk solid material or materials involved, to provide for the self cleaning feed trough of the bulk material vertically through actuators 92 that has been described in connection with bin 36.

The actuators 92 may also have the low profile bottom section 82 and its conveying surface 125A that are illustrated in FIG. 6, in place at low profile bottom section 80.

An important advantage of the actuator of FIGS. 9-11 is that the bulk material outlet chutes 82 and the parts associated with same permit the discharge stream emerging from the actuator 92 to be split into different streams that are supplied to different vibratory conveyors for feeding to different furnaces of the power plant. The arrangement of FIGS. 9-11 avoids the need to use the familiar "pant leg" type of chute to divide the discharge from the stationary bin into different flow streams, together with the vertical height elevation required by this type of chute.

FIGS. 12-19 show an embodiment of the invention in which the bin 36B is equipped with centerless baffles 83A, instead of baffles 83, at the levels 79 indicated in these Figures, with the remainder of the bulk solid material equipment involved being the same as disclosed in FIGS. 1-8. As indicated in FIGS. 13 and 16, the centerless baffles 83A, at each internal baffle level 79 each comprise a plurality of imperforate members shown in the form of plates 200 that are radially oriented relative to the bin side wall 60, are coplanar oriented at the respective baffles 83A, and are respectively supported by vertical support plates 202, with the respective plates 200 and their respective support plates 202 being affixed to bin wall 60 using welding techniques or the like (each plate 200 may be similarly secured to its support plate 202) and thus forming baffle segments 83B that make up a centerless baffle 83A at the respective baffle levels 79.

It is to be noted that the baffles 83A involved in the embodiment of FIGS. 12-19, at each internal baffle level 79 are defined by a plurality of the baffle segments 83B that individually are of the setup type (and comprising the respective pairs of plates 200 and 202), and that, in forming the respective baffles 83A for each internal baffle level the baffle 83B are cantilever mounted at the respective levels 79 indicated at such levels 79 of baffles 83A, such baffle segments 83B are coplanar related, and are not laterally connected, and are thus independent of each other at each level 79 they serve the bin to which they are applied to form the separate baffles 83A. It will thus be seen that each baffle 83A is defined by a set of baffles 83B.

FIGS. 20-22 show an actuator 92A, which are otherwise the same as actuator 92, similarly arranged.

Baffles 83A at the respective levels 79 are preferred for very difficult RDF or other "flake" type materials, such as RDF paper, cardboard, ribbons, shredded plastic items, and the like; where the particle size of the bulk solid material involved exceeds two inches in any given dimension (and of course is of the "flake" type), the baffles 83A are preferred. Where the facilities are to handle nothing but paper, or cardboard, or ribbons, or shredded plastic items, baffles 83A are recommended regardless of particle size, because of the difficulty of handling these "flake" materials; where these materials are encountered in combination in the bulk solid material being handled, the mixture is or is similar to RDF and the vessel internal baffles should be one of the types herein disclosed, depending on the particle size indicated. The number of baffle levels 79 employed in any one bin 36B, and the number of stub baffles 83B employed in any one baffle 83A, will depend on the size of the bin 36B involved. As indicated in FIG. 16, each baffle 83A is essentially centerless in nature, and the plates 200 of each baffle 83A are unconnected laterally thereof at each baffle level, to avoid the formation of vertical bridges that impede induced vertical flow.

In the showing of FIGS. 23 and 24 both types of baffles 83 and 83A are employed, while in the embodiment of FIG. 25, the centerless baffles 83A at the respective levels of same are displaced or staggered radially relative to and about the bin vertical centerline 64 so that vertically spaced adjacent levels of baffles 83A are disposed approximately midway between the baffles 83A above and below same. The baffles 83 and 83A are illustrated in bin 36D, while the baffles 83 and 83A shown in FIG. 25 are applied internally of bin 36A. The bins 36D and 36E are otherwise the same as bin 36 and are incorporated in similar bulk solid material storage and discharge equipment.

It will be apparent that the bin or activator internal baffles and the low profile bottom section that are illustrated provide a number of advantages.

For instance, the low profile bottom conveying section activated bins of this invention accept a greater volume of bulk solid material for storage, per unit of height, thus maximizing the storage space per activated bin per unit of height. Furthermore, because of the vibratory conveying action effected on the activated bin involved, and specifically on its internal baffles 83 or 83A and bottom surfaces 125 and 125A, the activated bin is inherently self cleaning.

It will also be noted that there are no moving parts inside the activated bin that require routine maintenance, and even though the activated bin arrangements involved effect a necessary conveying action on the bulk material handled by same, the input power requirements are relatively low, compared to other means of impelled retrieving, such as multi-auger "live bottom" bins.

It should also be noted that there is not relative motion between the internal parts of the activated bins involved, and thus they operate very quietly. For instance, the activated bins 36 all operate at less than 80 decibels even when they contain and are discharging bulk material in most instances, the expected operating sound level is expected to be around 65 to 70 decibels.

Since a vibratory conveying action is known to be of a "gentle" motion impelling type, it can be expected that the inside surfacings of the activated bins conforming to the utilizing flexible socket connections that are known to the art for connecting the disclosed bins to vibrating conveyors or the like, the assemblies involved can be made dust tight. It will also be observed that as the input power imposed by the motor assemblies 63 and 65 is of a "free force" type (rotating eccentric weights) the assemblies 63 and 65 can be started and stopped repeatedly without harming the basic assembly involved. This is important for "cycle type" operation.

The downward flow of bulk material contained within the disclosed activated bins and discharged therefrom is both concentric and symmetrical, thereby insuring "first in-first out" discharge relation of the bulk material supplied to the bin involved.

While the disclosed activated bins can be employed for storing and discharging many types of bulk solid materials responsive to vibratory conveying action, it is believed that the greatest benefit will be realized with "flake" type materials such as freshly picked beans, wood bark, RDF type fuels, and the like (in general anything long that is compared to its thickness).

As to the disclosed bin activators, all of the benefits and advantages described in connection with the disclosed bins can be obtained for conventional stationary bins by using the disclosed activators, which can be individually arranged to have the various improvements disclosed herein with reference to the disclosed bins. Further, heretofore when the discharge of the stationary bin through the familiar frusto-conical discharge opening was to be separated into two different streams, a "pair of pants" type chute arrangement had to be employed, which consumes excessive vertical room; by employing activators of the type illustrated by FIGS. 9-11 and 20-22, the vertical height consumed by conventional "pant leg" arrangements is eliminated.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a bin defining a central vertical axis and having a frusto-conical lower portion for receiving, storing, and discharging bulk solid materials that are of types that are responsive to vibratory conveying action, including:

means for stationarily mounting the bin, and a bin activator flexibly secured to the lower end of said bin lower portion, said bin activator comprising a cylindrical side wall having upper and lower ends that is symmetrical about the bin vertical axis, means for imparting to said activator a helical vibrating movement about the bin vertical axis to the bulk materials for effecting movement of the bulk materials received in said activator downwardly thereof for discharge from aid activator, vibration isolator means for mounting said activator to be vibrated by said helical vibrating imparting means, said vibrating means being mounted on said activator, said activator being formed to define a bottom section, said bottom section comprising a shallow cone centered on the axis and extending short of said side wall about the periphery of same, said cone having its axial center pointed upwardly, and defining about said center thereof a conveying surface, said bottom section also including at least one discharge port arrangement disposed adjacent said lower end of said cylindrical side wall and defining a vertically rectilinear discharge chute having a vertical central axis that said conveying surface conveys the bulk material to and that is spaced laterally of said cone axial center, said discharge port arrangement chute communicating through said cone adjacent said periphery of said cone, said activator having at least one internal baffle means fixed thereto above said bottom section for restricting gravity flow of said materials vertically of said activator and defining down feed porting for accommodating said downward vertical flow of said materials.

2. The bin activator set forth in claim 1 wherein:

said internal baffle means is of the inverted cone type centered on said axis.

3. The bin actuator set forth in claim 1 wherein:

said internal baffle means comprising a plurality of essentially coplanar baffles of stub relation to said axis.

* * * * *